Figure 1:
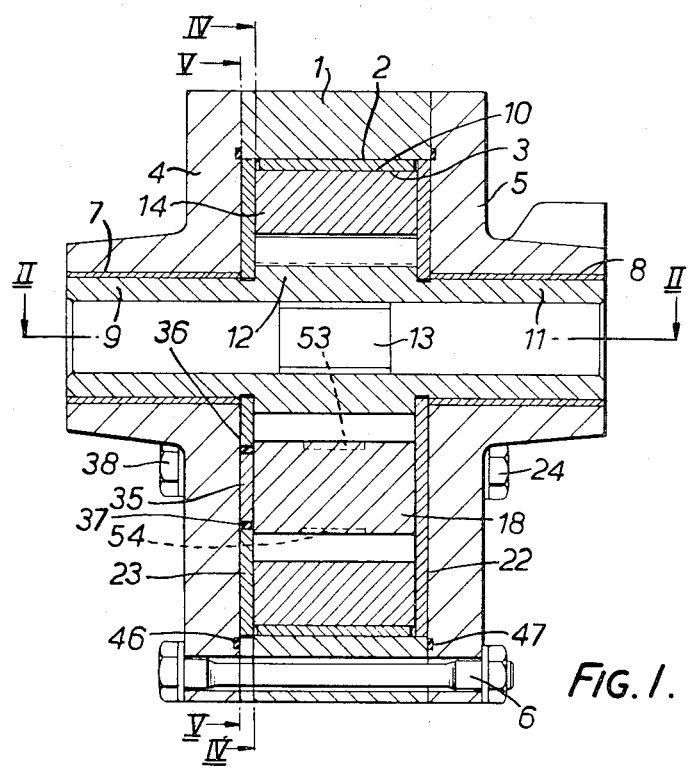

United States Patent
Lambeth

[11] 3,717,424
[45] Feb. 20, 1973

[54] HYDRAULIC APPARATUS
[75] Inventor: Dennis Ernest Lambeth, Benhall, Cheltenham, England
[73] Assignee: Dowty Technical Developments Limited, Brockhampton, Cheltenham, England
[22] Filed: March 22, 1971
[21] Appl. No.: 126,554

[30] Foreign Application Priority Data

Mar. 24, 1970 Great Britain ................. 14060/70

[52] U.S. Cl. .................. 418/126, 418/133, 418/170
[51] Int. Cl. ........................... F04c 1/06, F04c 27/00
[58] Field of Search ...... 418/126, 131, 132, 133, 169, 418/170

[56] References Cited

UNITED STATES PATENTS

| | | | |
|---|---|---|---|
| 2,312,891 | 3/1943 | Ferris | 418/133 |
| 2,787,963 | 4/1957 | Dolan et al. | 418/133 |
| 2,808,785 | 10/1957 | Hilton | 418/170 X |
| 3,311,064 | 3/1967 | Eichele et al. | 418/133 |
| 3,586,465 | 6/1971 | Eltze | 418/126 |
| 3,597,129 | 8/1971 | Crowther | 418/126 |

*Primary Examiner*—Allan D. Herrmann
*Attorney*—Young & Thompson

[57] ABSTRACT

This invention concerns a hydraulic displacement device, such as an internal gear pump, having an internally toothed gear in mesh with an externally toothed gear, a crescent-shaped land engaging at least some of the tips of unmeshed gear teeth and defining a high pressure zone and a low pressure zone with the position of teeth which are in mesh within the internally toothed gear, and at least one end bearing member engaging the end surfaces of the gears and loaded by liquid from the high pressure zone to engage the adjacent end surfaces of the gears. The present invention provides a means to provide a good fit between the end bearing member and the crescent-shaped land to take up wear at the end surfaces of the gears by providing a spacer member extending from the land parallel to the rotation axes and leaving a shoulder around the land and a hole within the end bearing member to enable it to fit over the spacer member and to engage the end surfaces of the gears, the shoulder of the land being so located that when the bearing member engages the end surfaces of the gears it is very closely spaced from the shoulder whereby as wear takes place the bearing member can move towards the shoulder.

10 Claims, 5 Drawing Figures

INVENTOR
DENNIS ERNEST LAMBETH
BY
Young + Thompson
ATTORNEYS

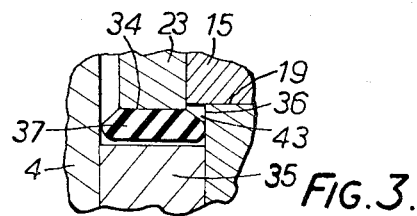
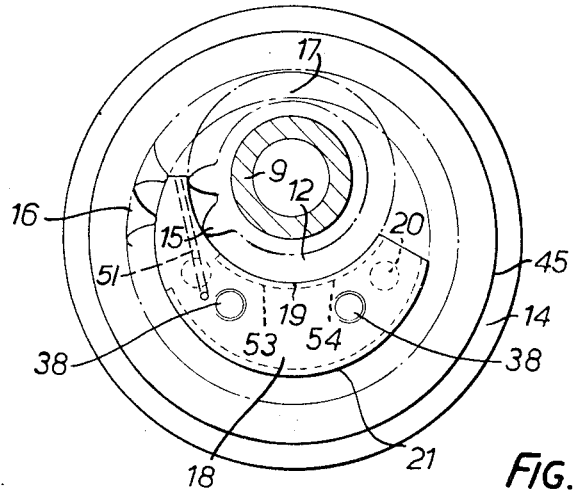
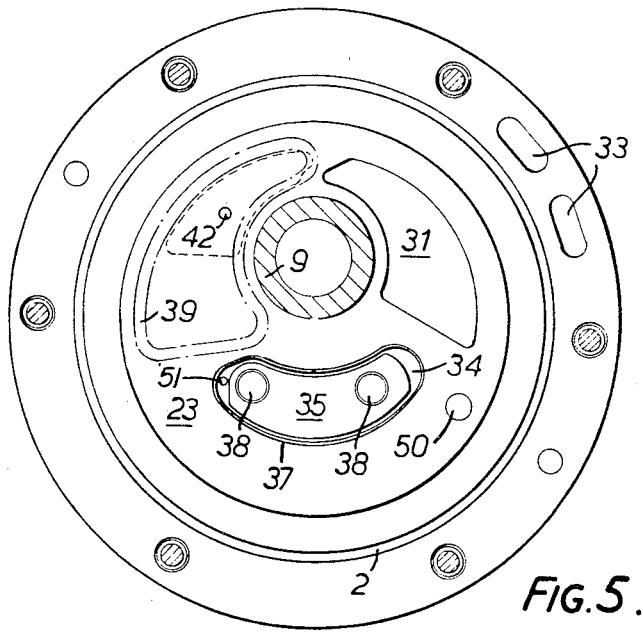

HYDRAULIC APPARATUS

This invention relates to a hydraulic displacement device having an internally toothed gear in mesh with an externally toothed gear, a crescent-shaped land engaging at least some of the tips of unmeshed gear teeth and defining with the position of teeth which are in mesh a high pressure zone and a low pressure zone within the internally toothed gear, at least one end bearing member engaging the end surfaces of the gears, said bearing member being loaded by liquid from the high pressure zone to engage the adjacent end surfaces of the gears, a high pressure connection for the high pressure zone and a low pressure connection for the low pressure zone. This kind of hydraulic displacement device will hereinafter be referred to as a pressure-loaded internal-gear device.

A disadvantage of a previously proposed pressure-loaded internal-gear device is the difficulty in providing an adequately good fit between the end bearing member and the crescent-shaped land such as to allow movement of the end bearing member to take up wear at the end surfaces of the gears and also to provide a good leak preventing fit between the end bearing member and the land.

The object of the present invention is to provide a pressure-loaded internal-gear device in which the leakage path between the end loading member and the crescent land is adapted to reduce as wear takes place.

In accordance with the present invention, a pressure-loaded internal-gear device includes a casing, an internally toothed gear rotatably mounted in the casing, an externally toothed gear rotatably mounted in the casing and in mesh with the internally toothed gear, a crescent-shaped land mounted in the casing to engage at least some of the tips of gear teeth not in mesh with one another, a spacer member extending from the land parallel to the rotation axes to provide a shoulder around the land, an end bearing member fitted within the casing and having a hole therein within which the spacer member is disposed so that the bearing member may engage the end surfaces of the gears, a loading zone isolated between the bearing member and the casing and adapted to receive liquid at pressure from the high pressure zone defined in the internally toothed gear by the land and the meshing gear teeth such that the bearing member is loadable onto the adjacent end surfaces of the gears in opposition to the force which will act directly on the bearing member by the pressure in the high pressure zone, the shoulder of the land being so located that, when the bearing member engages the said adjacent end surfaces of the gears, the bearing member is very closely spaced from said shoulder whereby as wear takes place the bearing member can move towards the shoulder.

The spacer member may be either separate from or integral with the land.

The loading zone may be fed directly from the high pressure zone by means of a small hole passing through the bearing member.

The hole in the bearing member which fits the said spacer member may be provided with a seal around its edge to engage the shoulder on the one side and the internal surface of the casing on the other side. The zone isolated by this seal around the spacer member may be fed with liquid at pressure from the meshing gear teeth.

The flat bearing member may be of thin sheet metal so as to be capable of slight bending movement.

The internally toothed gear may be rotatably mounted in a surrounding bearing in the casing.

The externally toothed gear may be supported on a driving shaft carried in bearings in the casing.

A second flat bearing member may be provided secured in the casing to engage the end surfaces of the gears opposite to those engaged by the first-mentioned bearing member.

Figure 2:
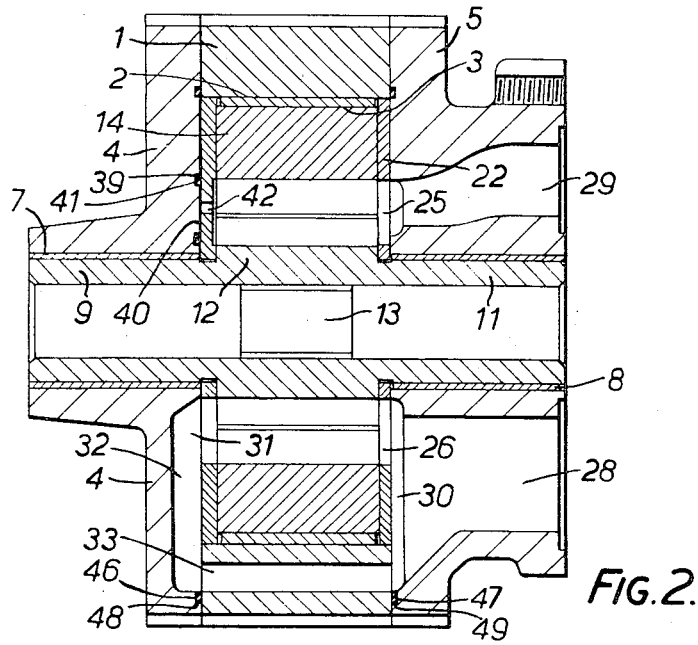

One embodiment of the invention for use as a pump will now be particularly described with reference to the accompanying drawings, in which, FIG. 1 is a cross-section through the pump, FIG. 2 is a cross-section through the pump taken on the line II—II of FIG. 1, FIG. 3 is an enlarged cross-section of part of the detail of FIG. 1, FIG. 4 is a section on the line IV—IV of FIG. 1, and FIG. 5 is a section on the line V—V of FIG. 1.

The illustrated gear pump is intended particularly to supply liquid at high pressure and high flow rate. The pump casing comprises an annular member 1 internally bored to receive a thin plain metal bearing 2 having an internal cylindrical bearing surface 3.

A pair of end covers 4 and 5 are secured to the annular member 1 by a plurality of bolts 6. The end covers 4 and 5 are provided with extensions coaxially bored parallel to the axis of the member 1 but eccentric relative thereto, these bores being provided with cylindrical bearing sleeves 7 and 8. The bearing sleeves 7 and 8 carry two parts 9 and 11 of a hollow drive shaft which are integrally formed with an externally toothed driving gear 12. The hollow interior of the parts 9 and 11 is formed with splines 13 to receive a splined driving shaft.

The driving gear 12 meshes with an internally toothed gear ring 14 whose cylindrical external surface fits closely within the bearing surface 3 for rotation therein. The teeth 15 of the gear 12 and the teeth 16 of the gear ring 14 are accurately shaped in a manner well known in standard gear technology to minimize the sliding contact between the gear teeth.

The eccentric location of the gear 12 relative to the gear 14 is such that in one position indicated at 17 in FIG. 4, the teeth 15 and 16 are in full mesh. A crescent-shaped space exists between the paths swept by the tips of the teeth 15 and 16, this space being occupied by a crescent-shaped land 18 which has a pair of part-cylindrical surfaces 19 and 21 which are spaced with a very small clearance from the tips of the teeth 15 and 16 respectively in the crescent-shaped space. The land 18 is firmly secured in position as will be described later in the specification.

The end surfaces of the two gears 12 and 14 are accurately finished plane surfaces, the axial length of the two gears measured between the end surfaces being exactly the same. A thin sheet metal end bearing member 22 is secured to the inner surface of the end cover 5 to engage one pair of end surfaces of the gears. A sheet metal bearing member 23 is mounted on the internal surface of the end cover 4 with the ability to move a small degree in the axial direction as will be further described in the specification. The land 18 is secured by bolts 24 to the end cover 5, such bolts passing through the bearing member 22 into the land 18, the tension in the bolts tightly gripping the bearing member 22 between the land 18 and the end plate 5. Accurate location for the land 18 is ensured by dowel pins 20 (see FIG. 4).

A pair of ports 25 and 26 (see FIG. 2) are formed through the bearing member 22 and co-operate with the end faces of the gears, the port 25 in the region where the gears approach the fully meshed position 17 and the port 26 in the region where the gears move away from the fully meshed position 17. The port 25 may be formed as two adjacent holes, the web of material between the holes forming a strengthening bridge against the action of high pressure. The end cover 5 on to which the bearing member 22 is attached is formed with inlet and delivery connections 28 and 29 (See FIG. 2) which co-operate with the ports 26 and 25 in the bearing member respectively.

A port 31 is formed in bearing member 23 (see FIG. 2) at a position corresponding to the inlet port 26 in bearing member 22. The inner surface of end cover 4 (see FIG. 2) includes a recess 32 which feeds inlet liquid from the inlet port 28 to the port 31 through a pair of passages 33 in the member 1. A recess 30 similar to recess 32 is also formed in the inner surface of the end cover 5 to extend from the inlet connection 28 to the passages 33. A hole 34 in the bearing member 23 is so shaped as to fit around a spacer member 35 on the end of the crescent land 18. The spacer member 35 is so arranged as to leave a shoulder 36 around the end of the crescent-shaped land. The length of the land, measured in the direction of the rotation axis from shoulder 36 to the bearing member 22 is very slightly less than the axial length of the gears between their end surfaces.

The hole 34 includes a rubber seal 37 secured around its edge, for example, by bonding. In the present embodiment the spacer member 35 is separate from the crescent land 18, but it is within the scope of this invention for the spacer member to be integral with the land 18. A pair of bolts 38 extend through the end cover 4 and the spacer member 35 into the land, and during assembly of the pump the two sets of bolts 38 and 24 are tightly screwed into position to help the two end covers 4 and 5 to resist any outward forces generated by hydraulic liquid in the pump.

In order to provide a pressure loading on the bearing member 23 a continuous groove 39 (see FIG. 2) is formed on the inner surface of the end cover 4. A rubber seal 41 fits into the groove 39 and engages against the bearing member 23 to define a zone 40 on the side of the bearing member 23 opposite to the zone in between the gear teeth 15 and 16 as they are coming to the full meshing point 17 during rotation. Liquid at pressure is fed through the hole 42 in the bearing member 23 from the high pressure zone between the land 18 and the teeth 15 and 16 as they move up towards the full meshing point 17. FIG. 3 is an enlarged cross-section showing more clearly the shoulder 36 of the land, the rubber seal 37, the edge of the hole 34 in the bearing member 23, the spacer member 35 and the end plate 4. FIG. 3 shows the thickness of the bearing member 23 in a rather exaggerated manner in comparison to the slightly thicker spacer member 35. The end surface of the gear teeth 15 as seen in FIG. 3 is slightly beyond the shoulder 36 of the crescent land to leave a space 43 in between adjacent edges of the bearing member 23, the gear teeth 15, the seal 37 and the shoulder 36. When the pump is initially assembled the space 43 will extend around the curved surface 19 of the crescent land adjacent to the shoulder 36 and a similar space will extend around curved surface 21. The bearing member 23 is prevented from rotation by its engagement on the spacer member 35 and by a dowel 50 which enters member 23 from end cover 4. At the same time the bearing member 23 is capable of slight axial movement.

The pump is assembled for operation as shown in the drawings. Rubber sealing rings 46 and 47 are carried in grooves 48 and 49 in end covers 4 and 5 to seal against the end surfaces of the annular member 1.

When in use the gears as seen in FIG. 4 will rotate in a clockwise direction, the gear 12 being the driving gear. Liquid enters the pump through the connection 28 and through ports 26 and 31 in the bearing members 22 and 23 into the spaces between the teeth of the gears as they are moving away from the meshing position 17. Liquid fills the spaces between the gears and as the gear teeth meet the curved surfaces 19 and 21 of the crescent land the spaces between the teeth will be sealed. As the teeth move towards the meshing position 17, the teeth 15 enter spaces between the teeth 16 and the teeth 16 enter the spaces between the teeth 15 thus reducing the effective volume for liquid and creating pressure in the liquid. This pressure will react on the teeth 16 to urge the gear ring 14 against the driving force exerted by the teeth 15. The teeth 15 and 16 at their meshing positions will seal one against the other to prevent the high pressure liquid from passing the meshing point of the teeth towards the low pressure inlet zone between the gears. The high pressure liquid is then urged out of the port 25 into the delivery connection 29. Some of the liquid at pressure will pass through the small hole 42 into the zone 40 defined by the seal 41. The pressure in this zone will then react on the bearing member 23 to urge it against the adjacent end surfaces of the gears 12 and 14 and at the same time to urge the gears to the right as seen in FIGS. 1 and 2 so that their opposite end surfaces engage against the bearing member 22. This pressure loading ensures good sealing of the pressure zone between the gears 12 and 14 and helps to reduce leakage losses within the pump.

The two spaces 43 around the curved surfaces 19 and 21 of the land represent leakage passages by which liquid at high pressure may pass from the high pressure zone to the low pressure zone. However, during the initial running of the pump as the engaging bearing surfaces bed one into the other, the spaces 43 will be considerably reduced in cross-section and when the pump is fully run in these spaces will have quite a small cross-section and will represent negligible leakage.

After a substantial amount of use has taken place the bearing member 23 will make contact with the shoulder 36 and from this time onward the loading applied to the bearing member 23 within the zone enclosed by a groove 39 will hold the bearing member 23 in contact with the adjacent end surface of the gears by virtue of slight bending of the bearing member 23. It will be appreciated that the total amount of wear will be very slight during the whole life of the pump and that the axial clearance shown in FIG. 3 between the bearing member 23 and the shoulder 36 is very considerably exaggerated for the purpose of the explanation.

The seal will in practise spread to make sealing contact between the shoulder 36 and the inner surface of the end cover 4. For preference the zone enclosed by the seal 34 is fed with liquid at pressure to ensure spreading of the seal 37. Such liquid is fed through a drilled passage 51 extending in land 18 from the space between the gears containing liquid at high pressure to a point between the seal 37 and the spacer member 35.

I claim:

1. A pressure loaded internal gear device including a casing, an internally toothed gear rotatably mounted in the casing, an externally-toothed gear rotatably mounted in the casing and in mesh with the internally toothed gear, a crescent-shaped land mounted in the casing to engage some at least of the tips of the gear teeth not in mesh with one another, a spacer member extending from the land parallel to the rotation axis to provide a shoulder around the land, a flat bearing member fitted within the casing and having a hole therein within which the spacer member is disposed so that the bearing member may engage the end surfaces of the gears, a loading zone isolated between the bearing member and the casing and adapted to receive liquid at pressure from the high pressure zone defined in the internally toothed gear by the land and the meshing gear teeth such that the bearing member is loadable on to the adjacent end surfaces of the gears in opposition to the force which will act directly on to the bearing member by the pressure in the high pressure zone, the shoulder of the land being so located that, when the bearing member engages the said adjacent end surfaces of the gears, the bearing member is very closely spaced from said shoulder whereby as wear takes place the bearing member can move towards the shoulder.

2. A pressure loaded internal gear device as claimed in claim 1, wherein the spacer member is separable from the land.

3. A pressure loaded internal gear device as claimed in claim 1 wherein the loading zone is fed directly with pressure liquid from the high pressure zone through a small hole passing through the bearing member.

4. A pressure loaded internal gear device as claimed in Claim 1, wherein the hole in the bearing member which fits the said spacer member is provided with a seal around its edge to engage the shoulder on one side and the internal surface of the casing on the other side.

5. A pressure loaded internal gear device as claimed in claim 4, wherein the zone isolated by the seal around the spacer member is fed with liquid at pressure from the high pressure zone.

6. A pressure loaded internal gear device as claimed in claim 1, wherein the bearing member is of thin sheet metal so as to be capable of slight bending movement.

7. A pressure loaded internal gear device as claimed in claim 1, wherein the internally toothed gear is rotatably mounted in a surrounding bearing in the casing.

8. A pressure loaded internal gear device as claimed in claim 1, wherein the externally toothed gear is supported by the driving shaft carried in bearings in the casing.

9. A pressure loaded internal gear device as claimed in claim 1, including a second bearing member secured within the casing to engage the end surfaces of the gears opposite to those engaged by the first-mentioned member.

10. A pressure loaded internal gear device as claimed in claim 9, wherein the crescent-shaped land is bolted to the casing by means of bolts extending through the casing and the second bearing member into the land.

* * * * *